United States Patent [19]

Demmer

[11] Patent Number: 5,619,270
[45] Date of Patent: Apr. 8, 1997

[54] SAMPLE RATE CONVERTER AND SAMPLE RATE CONVERSION METHOD

[76] Inventor: Walter Demmer, Dormitzer Strasse 3, 90411 Nuremberg, Germany

[21] Appl. No.: 497,181

[22] Filed: Jun. 30, 1995

[30] Foreign Application Priority Data

Jul. 1, 1994 [DE] Germany .......................... 44 23 224.1

[51] Int. Cl.$^6$ .................................................. H04N 7/01
[52] U.S. Cl. ......................................... 348/441; 364/727
[58] Field of Search ...................................... 348/441, 639; 364/727, 724.1; H04N 7/01

[56] References Cited

U.S. PATENT DOCUMENTS

| | | | |
|---|---|---|---|
| 4,055,756 | 10/1977 | Jolivet | 364/727 |
| 4,549,212 | 10/1985 | Bayer | 364/727 |
| 4,663,595 | 5/1987 | Mehrgardt et al. | 348/639 |
| 4,862,271 | 8/1989 | Smith et al. | 348/441 |
| 5,513,120 | 4/1996 | Berlad | 364/724.1 |

FOREIGN PATENT DOCUMENTS

| | | |
|---|---|---|
| 0181953A1 | 5/1986 | European Pat. Off. . |
| 3413694A1 | 10/1984 | Germany . |
| 3544865A1 | 6/1986 | Germany . |

*Primary Examiner*—Victor R. Kostak
*Attorney, Agent, or Firm*—Daniel J. Staudt

[57] ABSTRACT

The invention is a sample rate converter, which converts input sample values of a signal digitized with a first predetermined clock frequency into desired sample values at a second virtual sample frequency, with a delay device, which delays the serial input sample values and outputs in parallel a block of delayed input sample values $z^{-2}$ to $z^{+2}$, a computing device, with a WHT stage, which transforms the delayed input sample values ($z^{-2}$ to $z^{+2}$), by using a Walsh-Hadamard transformation, into the WHT domain, and an interpolating device, which interpolates in equally weighted manner the resulting WHT coefficients and performs an amplitude correction of the interpolation results.

28 Claims, 8 Drawing Sheets

1*4-WHT AND IWHT

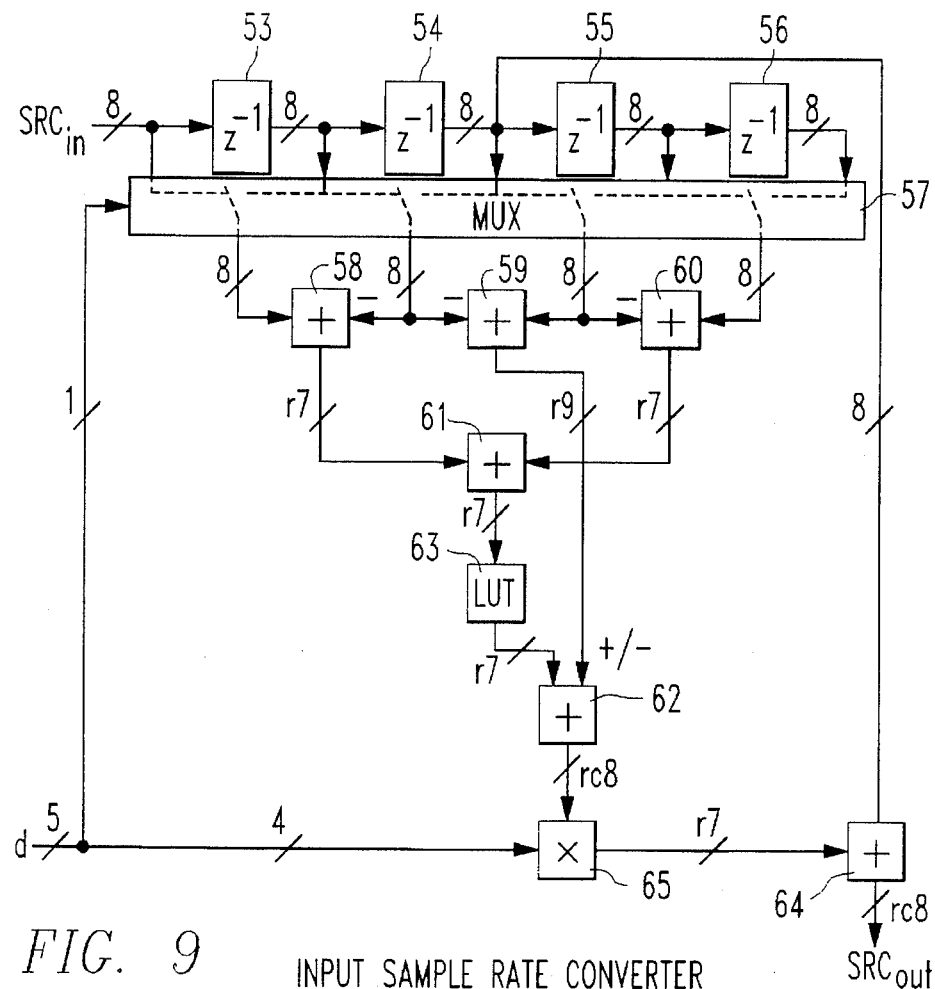
FIG. 9  INPUT SAMPLE RATE CONVERTER
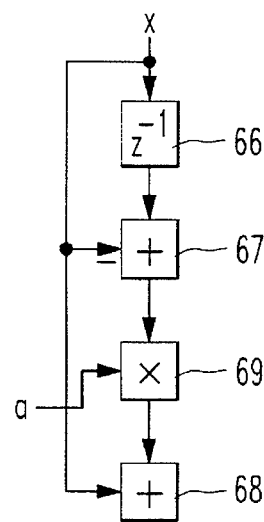
FIG. 10  OUTPUT SRC

SAMPLE RATE CONVERTER AND SAMPLE RATE CONVERSION METHOD

FIELD OF INVENTION

The invention relates to a sample rate converter and to a method for sample rate conversion, in which input sample values of a signal digitized with a first predetermined clock frequency are converted into desired sample values at a second virtual sample frequency.

BACKGROUND OF INVENTION

Such sample rate converters are used in digital video signal decoders, which convert sample values of the video signal digitized with a first clock frequency for the further processing of the signal, such as demodulation, decoding or digital image processing, into sample values at a second "virtual" sample frequency. They are also usable in multi-standard decoders, which can process video signals of different standards with diverging color subcarrier frequencies and line frequencies.

Color video signals, so-called composite video, blanking and sync signals (CVBS), are essentially composed of a brightness signal or a luminance component (Y), two color difference signals or chrominance components (U, V or I, Q), vertical and horizontal sync signals (VS, HS) and a blanking signal (blank, BL). The structure of a composite video signal (CVBS) and the corresponding Y, U and V signals are shown in FIG. 1.

FIG. 1a shows a composite video signal for an EBU (European Broadcasting Union) color beam test signal, in which the six hue(tint) values belonging to the vertical color beam in "carrier packets" with the color carrier frequency are superimposed on the luminance component Y. For color carrier generation a color subcarrier frequency sync pulse, the burst, is transmitted directly behind the line sync pulse, SYNC. The burst phase and the burst amplitude are used as reference values for determining the line and the color saturation of the demodulated signal which is represented by the individual carrier packets.

The different coding processes NTSC, PAL and SECAM used in the known color television standards differ in the nature of the chrominance transmission, particularly the different systems use different color subcarrier frequencies and different line frequencies.

The following explanations relate to PAL and NTSC systems, but correspondingly apply to other standard video signals and nonstandard signals.

The color subcarrier frequency (fsc) of a PAL system and a NTSC system is fsc(NTSC) = 3.58 MHz or
fsc(PAL) = 4.43 MHz.

In addition, in the PAL and NTSC systems, the ratios of the color subcarrier frequency (fsc) to the line frequency (fh) is given by fsc(NTSC) = 227.50*fh or 4·fsc(NTSC) = 910·fh
fsc(PAL) = 283.75*fh or 4·fsc(PAL) = 1135·fh so that the phase of the color subcarrier in NTSC changes by 180°/line and in PAL by 270°/line.

The prior art digital video signal processing and decoding differentiates between two system architectures. They are burst-locked architecture and line-locked architecture. These systems operate with sample frequencies for the video signal, which are produced in phase-locked manner to the color subcarrier frequency transmitted with the burst pulse or in phase-locked manner to the line frequency, respectively.

In the case of decoders with a burst-locked architecture the sample frequency is selected in such a way that on the one hand it is not too high in order to keep the power loss low and on the other hand so that the Nyquist theorem is fulfilled, i.e. $f_a > 2 \cdot fsc$. For problem free processing of the modulated color carrier in the decoder it is appropriate to use a sample frequency corresponding to an even multiple of the color subcarrier.

In line-locked architectures the clock of the digital system is derived from the line frequency and is an integral multiple of the latter, so that an integral number of pixels are produced per line.

Both systems suffer from the disadvantage that the clock frequencies for digitizing the video signal are derived from the video system, namely from the color subcarrier frequency or the line frequency, whereas in a PC environment working takes place with completely different clock frequencies, so that due to the different frequencies in the overall system intermodulation products and crosstalk of signals can have a disturbing effect on the overall operation and image quality. As the clock frequencies of PC's are not generally suitable for sampling video signals, because they do not satisfy the above-explained conditions, prior art decoders in each case have their own oscillators for producing the sample frequencies suitable for a particular television standard.

A data stream of a sample signal with a specific desired clock frequency can also be produced in that input sample values digitized with a first predetermined clock frequency are converted into desired sample values at a second virtual sample frequency.

Sample rate conversion and scaling can be looked upon as identical functions, because both are based on the interpolation of a data stream in a clock domain, in order to produce another data stream in another virtual clock domain. Scaling is normally understood to cover a wider range of derived sample rates than sample rate conversion and operates both in the horizontal and vertical direction. Generally said wider range requires an adaptive low-pass filters in order to avoid aliasing.

In digital color video signal decoders the input sample rate converter requirements are particularly high, because it has to transmit a composite video signal (CVBS), whereas the output sample rate converter and/or scaler only has to transmit a single signal component (Y, U, V). From research carried out in connection with the human visual perception, it is known that such composite signals are relatively sensitive to distortions of their high frequency components. The composite signal requires a good restoration of its high frequency contents in order to avoid high frequency distortion, which can occur in the chrominance channel as low frequency signal components following demodulation and in order to avoid interference or "crosstalk" between chrominance and luminance.

The following example illustrates the requirements made with regards to the precision of a sample rate converter for a digital color video signal decoder. On converting sample values digitized with a clock frequency of 30 MHz (PC-clock) into desired sample values at a virtual sample frequency of 17.72 MHz (4·fsc (PAL)), the time variation between the desired sample values of the virtual sample frequency must be max 1.5 ns and the phase shift max 2°, so that the variation of the sample values are not visible as color errors.

Depending on the nodes and with what particular weighting interpolation takes the sample frequency, whereas with an equally weighted interpolation, i.e. with uniform node spacings, amplitude errors occur.

SUMMARY OF THE INVENTION

Therefore the invention address the above difficulties and provides a sample rate converter and a sample rate conversion process, which can produce an adequately precise and distortion-free reproduction of a signal digitized with a first predetermined clock frequency at a second virtual sample frequency. The circuitry and computing expenditure for carrying out the sample rate conversion must be kept as low as possible.

Also the invention provides a method for sample rate conversion, in which input sample values of a signal digitized at a first predetermined clock frequency are converted into desired sample values of a second virtual sample frequency, in that; an equally weighted interpolation is performed between each of two adjacent sample values. The interpolation result obtained undergoes an amplitude correction, an equally weighted interpolation of the corrected interpolation result is in each case performed with its neighboring values, which can be neighboring sample values or neighboring interpolation results. The interpolation result obtained undergoes an amplitude correction and the interpolation and correction are repeated until a desired resolution necessary for the virtual sample frequency is obtained.

According to an embodiment of the process according to the invention of the interpolation results obtained only those are selected which correspond to the desired sample values at the virtual sample frequency. Alternatively only the interpolation results necessary for the desired sample values at the virtual sample frequency are formed.

It is advantageous for five successive input sample values ($z^{-2}$ to $z^{+2}$) in two blocks of in each case four adjacent values ($z^{-2}$ to $z^1$ and $z^{-1}$ to $z^2$) are transformed into the WHT domain by means of two one-dimensional (1*4) Walsh-Hadamard transformations (WHT). Corresponding WHT coefficients of the two WHT matrixes formed thereon are interpolated in equally weighted manner and the resulting WHT coefficients are multiplied with a correction factor.

The corrected WHT coefficients can be transformed back into the pixel domain by means of an inverse (1*4) WHT. However, the corrected WHT coefficients can also be directly used for the further processing of the sample values in the WHT domain.

The invention also relates to a sample rate converter, which converts input sample values of a signal digitized at a first predetermined clock frequency into desired sample values at a second virtual sample frequency, with a delay means, which delays the serial input sample values and outputs in parallel a block of delayed input sample values $z^{-2}$ to $z^{+2}$. A computing device, with a WHT stage, transforms the delayed input sample values ($z^{-2}$ to $z^{+2}$) into the WHT domain by means of a Walsh-Hadamard transformation, and an interpolating means, which interpolates in equally weighted manner the resulting WHT coefficients and performs an amplitude correction of the interpolation results.

According to a preferred embodiment of the invention, the sample rate converter comprises a multiplexer between the delay means and the computing means. The multiplexer selects from five input sample values $z^{-2}$ to $z^{+2}$ four adjacent values $z^{-2}$ to $z^{+1}$ or $z^{-1}$ to $z^{+2}$ and transfers the same to the computing means, as a function of the position of the sought desired sample value relative to the central of the five input sample value $z^0$.

The computing device performs the following equations:

$$H1(z)_d = |d| \cdot [(z^{-1} - z^0) - \epsilon \cdot (z^{-2} - z^{-1} - z^0 + z^1)] + z^0 \text{ for } d<0$$

$$H2(z)_d = |d| \cdot [(z^1 - z^0) - \epsilon \cdot (z^{-1} - z^0 - z^1 + z^2)] + z^0 \text{ for } d \geq 0$$

in which d is the delay of the sought desired sample value relative to the central of the five input sample values $z^0$ and $\epsilon$ is a correction factor.
In addition, the following apply:

$$d = (i - 16)/32 \quad \text{for } d < 0 \text{ and}$$
$$d = i/32 \quad \text{for } d \geq 0$$

in which i=1 . . . 15, and $0.18 \leq \epsilon \leq 0.22$, particularly $\epsilon = 0.1934$.

According to an embodiment of the invention the computing means has six adders and two multipliers.

According to another embodiment of the invention the computing means has six adders, a multiplier for weighting the interpolation result with d and a look-up table (LUT) for introducing the correction factor $\epsilon$.

Finally, the invention provides for the use of a sample rate converter of the described type as an input stage and/or output stage for a digital multistandard decoder for video signals.

The sample rate converter according to the invention re-interprets the individual sample values of a data stream digitized with the predetermined clock frequency in such a way that they correspond to another "virtual" sample frequency. In a multistandard decoder the virtual sample frequency can be adapted to the corresponding standard of the incoming video signal from a NTSC system or a PAL system or from other video systems.

BRIEF DESCRIPTION OF THE DRAWINGS

The invention is described in greater detail hereinafter relative to preferred, non-limitative embodiments and the following drawings:

FIG. 9 A circuit diagram for realizing an input sample rate converter for the decoder of FIG. 8.

FIG. 10 A circuit diagram for realizing an output sample rate converter for the decoder of FIG. 8.

DETAILED DESCRIPTION OF THE INVENTION

The pixel range sample rate conversion is a highly demanding task requiring poly-phase filters, whose coefficients change from clock to clock. A simple interpolation between adjacent pixel values would give undesired frequency-dependent amplitude fluctuations, as shown in FIG. 2, as well as a non-linear phase response according to FIG. 3.

Figure 1:
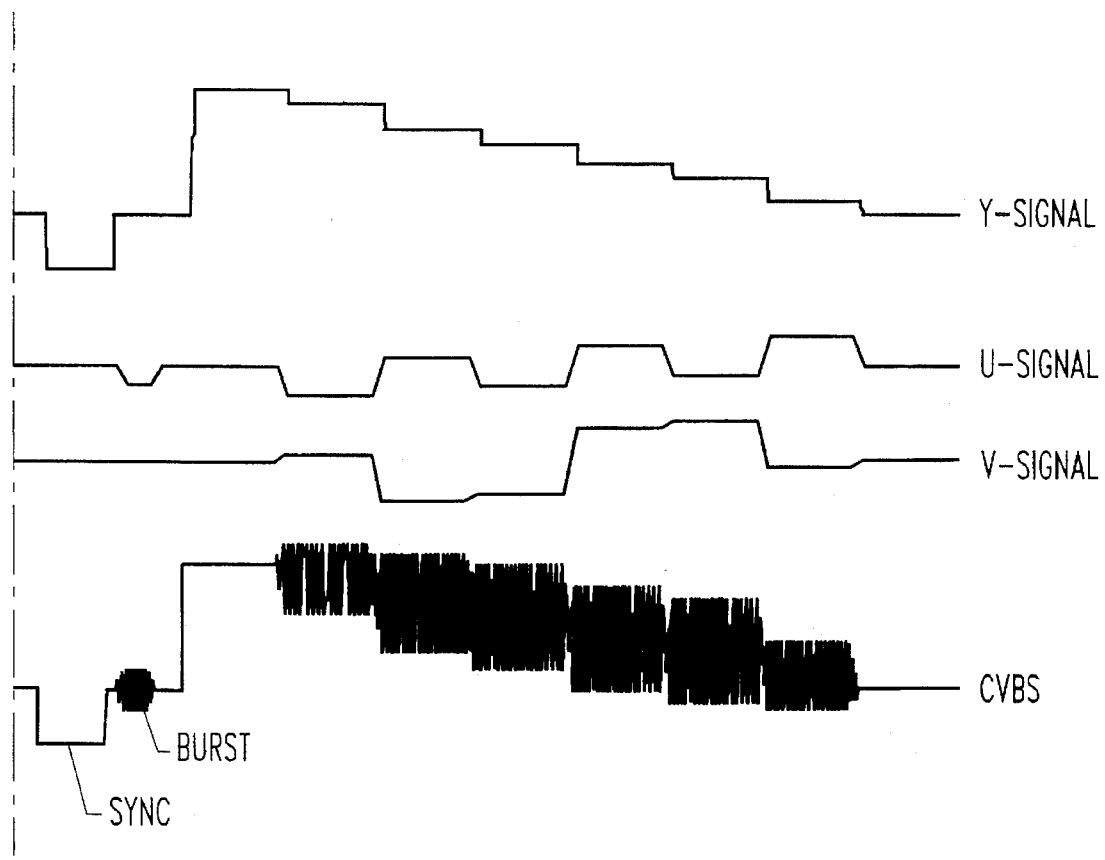
FIG. 1 A composite EBU color bar video signal (CVBS) and the corresponding Y, U and V signals.
Figure 2:
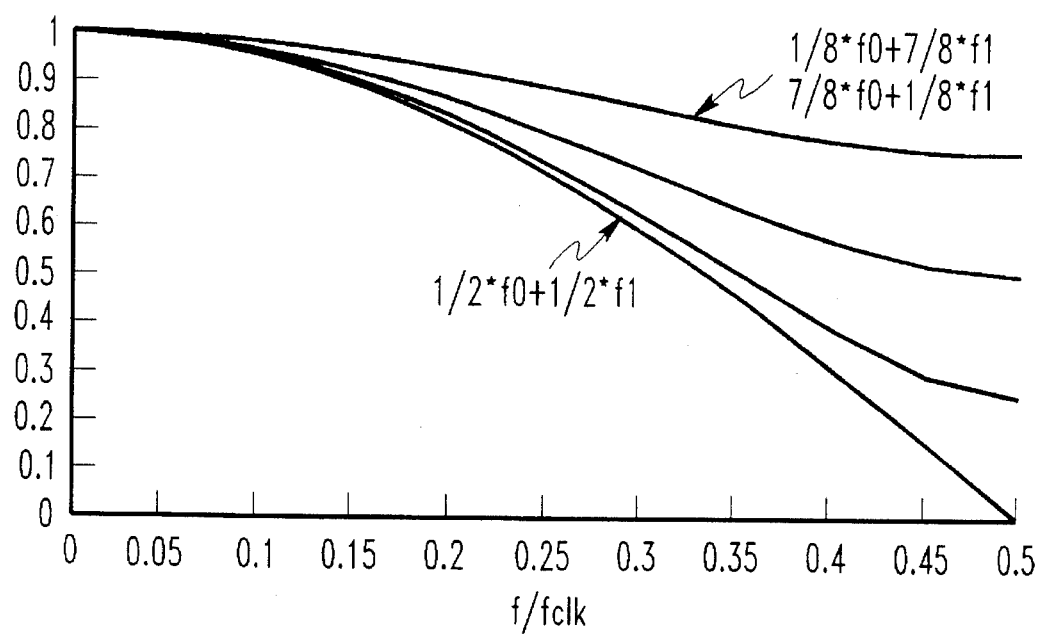
FIG. 2 The amplitude response of a conventional interpolator.
Figure 3:
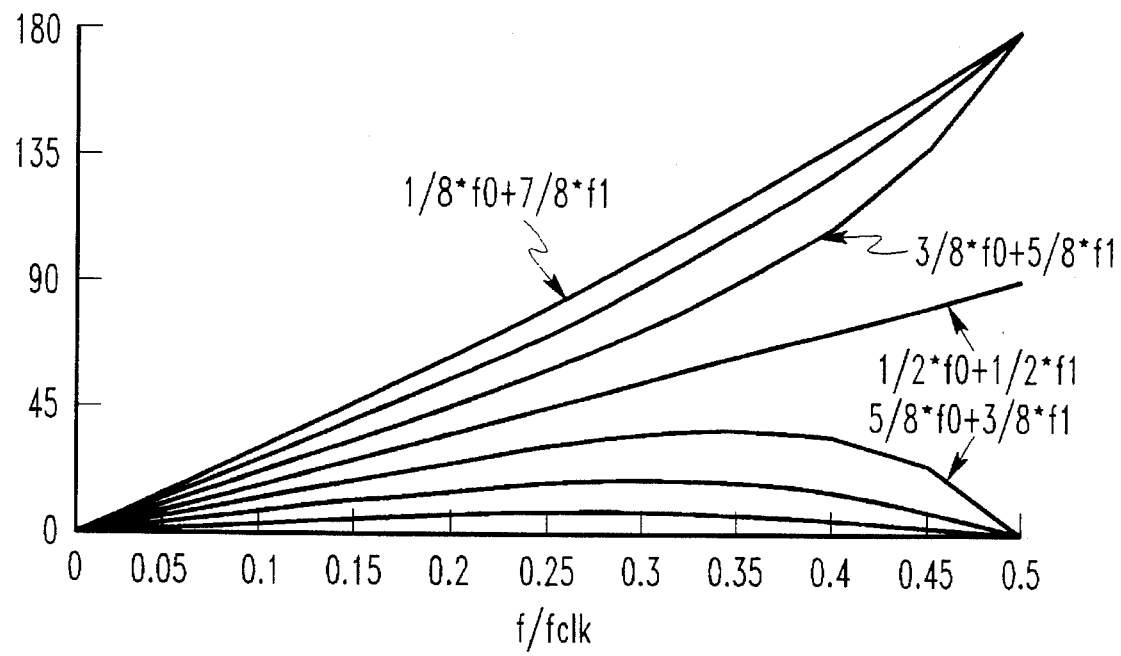
FIG. 3 The phase-frequency characteristic of a conventional interpolator.

FIG. 2 illustrates the dependence of the amplitude response of the sample frequency in the case of an equally weighted linear interpolation (½·f0+½·f1) and differently weighted interpolations. FIG. 3 shows the corresponding phase response for an equally weighted linear interpolation (½·f0 +½·f1) and differently weighted interpolations.

Conventionally sample rate conversions, i.e. interpolations of pixels, were performed in the pixel domain using poly-phase filters. Different procedures have been adopted for obviating the problems referred to hereinbefore, e.g. bilinear interpolation, square spline function and cubic spline function. The simplest form, i.e. bilinear interpolation, does not fulfill the strict requirements with respect to the amplitude response and phase response, which must at least be respected by an input sample rate converter for a video signal decoder. However, square and cubic spline functions require much greater effort and expenditure for their implementation.

A derivation of the cubic spline function in the form of a poly-phase filter was chosen as the starting point for further research, in order to minimize complexity by means of a hybrid solution between the pixel and the Walsh-Hadamard domain.

To facilitate understanding the principles of Walsh-Hadamard transformations (WHT) will now be briefly described. In the same way as discrete Fourier transformation (DFT), discrete cosine transformation (DCT) and Karhunen-Loeve transformation, Walsh-Hadamard transformation (WHT) belongs to the class of lossless, orthogonal unitary transformations. In this class WHT is the simplest form of a transformation. WHT $[T_{WHT}]$ is a square matrix of +1 and −1, whose lines and columns are orthogonal and the following applies:

$$\text{Eq. 1} \quad T_{WHT} = T_{WHT}^t = T_{WHT}^{-1}$$

The least significant WHT matrix is of order two and has the following form:

$$H_2 = \begin{pmatrix} 1 & 1 \\ 1 & -1 \end{pmatrix} \quad \text{Eq. 2}$$

The higher order WHT matrixes are obtained from a Kronecker product of H2 o H2:

$$H_{4n} = \begin{bmatrix} H & H \\ H & -H \end{bmatrix} \quad \text{Eq. 3}$$

WHT fulfills equations 4 and 5 (inverse transformation), the example of a 4×4 WHT being reproduced in equation 6.

$$F(u,v,t) = \sum_{x=0}^{M-1} \sum_{y=0}^{N-1} f(x,y,t) \cdot \Phi_{u,v}(x,y) \quad \text{Eq. 4}$$

$$f(x,y,t) = \sum_{u=0}^{M-1} \sum_{v=0}^{N-1} F(u,v,t) \cdot \Phi_{x,y}(u,v) \quad \text{Eq. 5}$$

Wherein F(u,v,t) are the transformed coefficients in the WHT range, f(x,y,t) are the sample values in the pixel range, $\Phi_{u,v}$ and $\Phi_{x,y}$ are the Walsh-Hadamard transformation matrixes and N, M are the rows and columns of 2-dimensional fields.

$$\Phi_{u,v} = \Phi_{x,y} \Phi_{x,y} = \begin{bmatrix} +1 & +1 & +1 & +1 \\ +1 & +1 & -1 & -1 \\ +1 & -1 & -1 & +1 \\ +1 & -1 & +1 & -1 \end{bmatrix} \quad \text{Eq. 6}$$

The transformation coefficients appear as sampled values of a set of filters. The bandwidth of the resulting filters decreasing with an increase of the basis of the WHT and the number of filters is correspondingly increased. The least and most significant transformation coefficients correspond to the values of a low-pass or high-pass filter.

The essence of WHT, which only comprises basic functions built up exclusively from +1 and −1, gives a simple and multi-plierless structure, which can easily be implemented in IC's. It is pointed out in this connection that the sample rate of the individual WHT coefficients decreases as a function of 1/x of the basis of the WHT. Thus, if the order or basis of the WHT is increased, then the necessary computing capacity only increases by $\log_2 (x)$.

The multidimensional WHT and its inverse IWHT are completely separable into a cascade of one-dimensional WHTs (IWHTs). The example of a 1×4-WHT and –IWHT shown in FIG. 4 requires adders and subtracters with only two inputs and it is easy to decrease or increase the WHT order.

Figure 4:
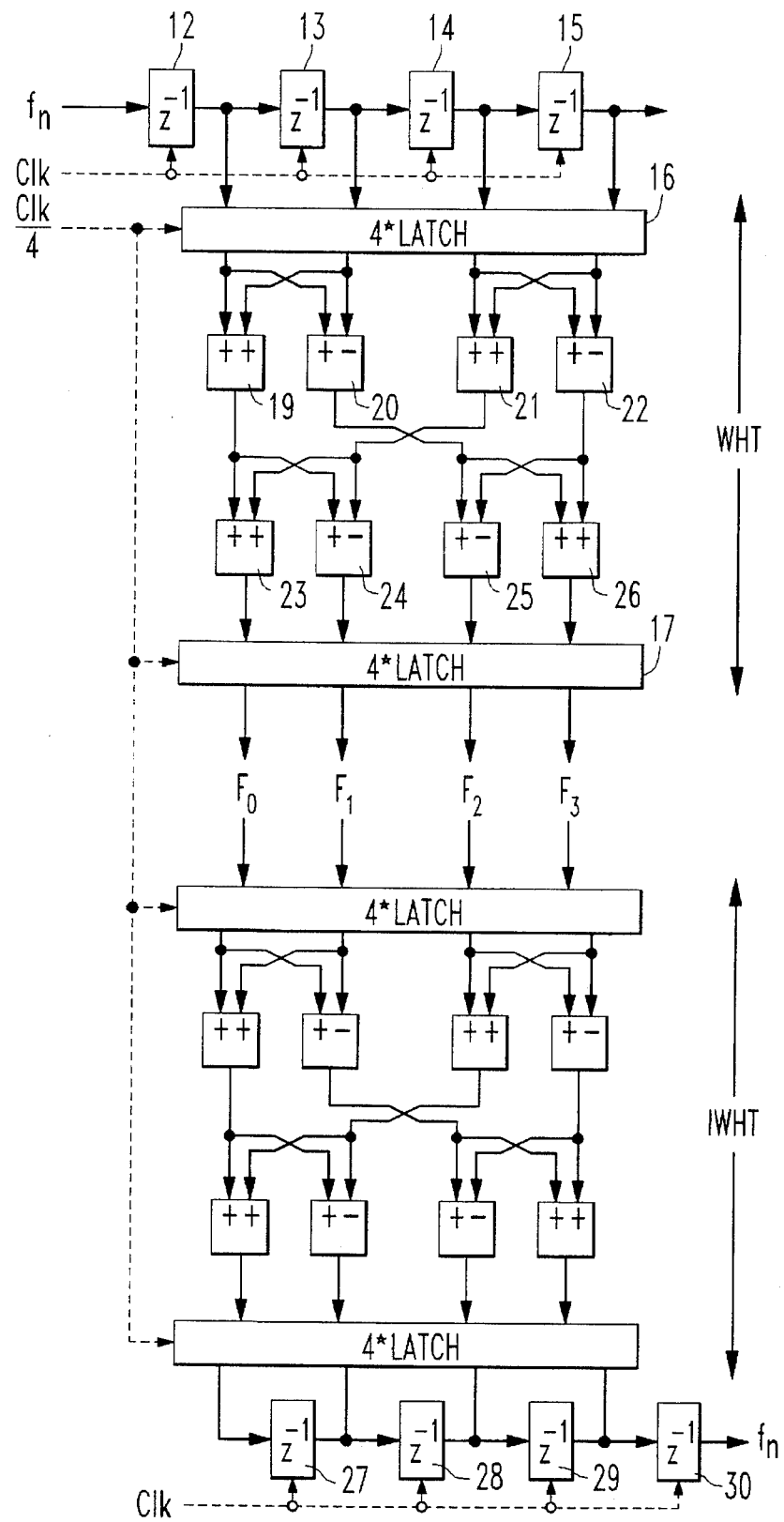
FIG. 4 A circuit diagram for realizing a 1×4 WHT and a 1×4 IWHT.

The circuit for realizing a 1×4-WHT shown in FIG. 4 comprises four delay elements 12, 13, 14, 15, two latches 16, 17 and eight adders or subtracters 19 to 26. At the input of the series-connected delay elements, 12 to 15, is inputted with the sampled video signal in the time or pixel domain in the form of input sample values fn. In each delay element the signal $f_n$ is delayed by one clock period (CLK) and outputted at the latch 16. The latter outputs in parallel four delayed signal values f1 to f4 with a clock frequency of CLK/4 to the adders or subtracters 19 to 26 respectively. The adders are interconnected as shown in FIG. 4 and into each case one adder 19 or 21 and one subtracter 20 or 22 are inputted in the first two or the second two delayed signal values and the output signals of the first four adders 19 or 22 are used as input signals for the second row of adders or subtracters 23 to 26. The output signal of the first adder 19 is inputted into the adder 23 and the subtracter 24, the output signal of the subtracter 20 is inputted into the subtracter 25 and the adder 26, the output signal of the adder 21 is inputted into the adder 23 and the subtracter 24 and the output signal of the subtracter 22 is inputted into the subtracter 25 and the adder 26. The output signals of the adders 23 to 26 are transferred to the latch 17 from where they can be read out in parallel as transformation coefficients $f_0$, $f_1$, $f_2$ and $f_3$. The adder circuit for a 1×4-WHT shown in FIG. 4 fulfills the following equation:

$$\begin{pmatrix} F_0 \\ F_1 \\ F_2 \\ F_3 \end{pmatrix} = \begin{pmatrix} WHT_0 \\ WHT_1 \\ WHT_2 \\ WHT_3 \end{pmatrix} = \begin{pmatrix} 1 & 1 & 1 & 1 \\ 1 & 1 & -1 & -1 \\ 1 & -1 & -1 & 1 \\ 1 & -1 & 1 & -1 \end{pmatrix} \times \begin{pmatrix} f_1 \\ f_2 \\ f_3 \\ f_4 \end{pmatrix} \quad \text{Eq. 7}$$

The circuit for the inverse Walsh-Hadamard transformation (IWHT) is identical to the described circuit, because WHT=IWHT, but the delay elements 27 to 30 are located at the output and not the input of said circuit.

In the WHT range the task of an amplitude and frequency distortion-free interpolation is not less demanding than in the pixel domain, because a very wide basis is required for the Walsh-Hadamard transformation in order to achieve an adequately finely fanned out frequency transmission.

Figure 5:
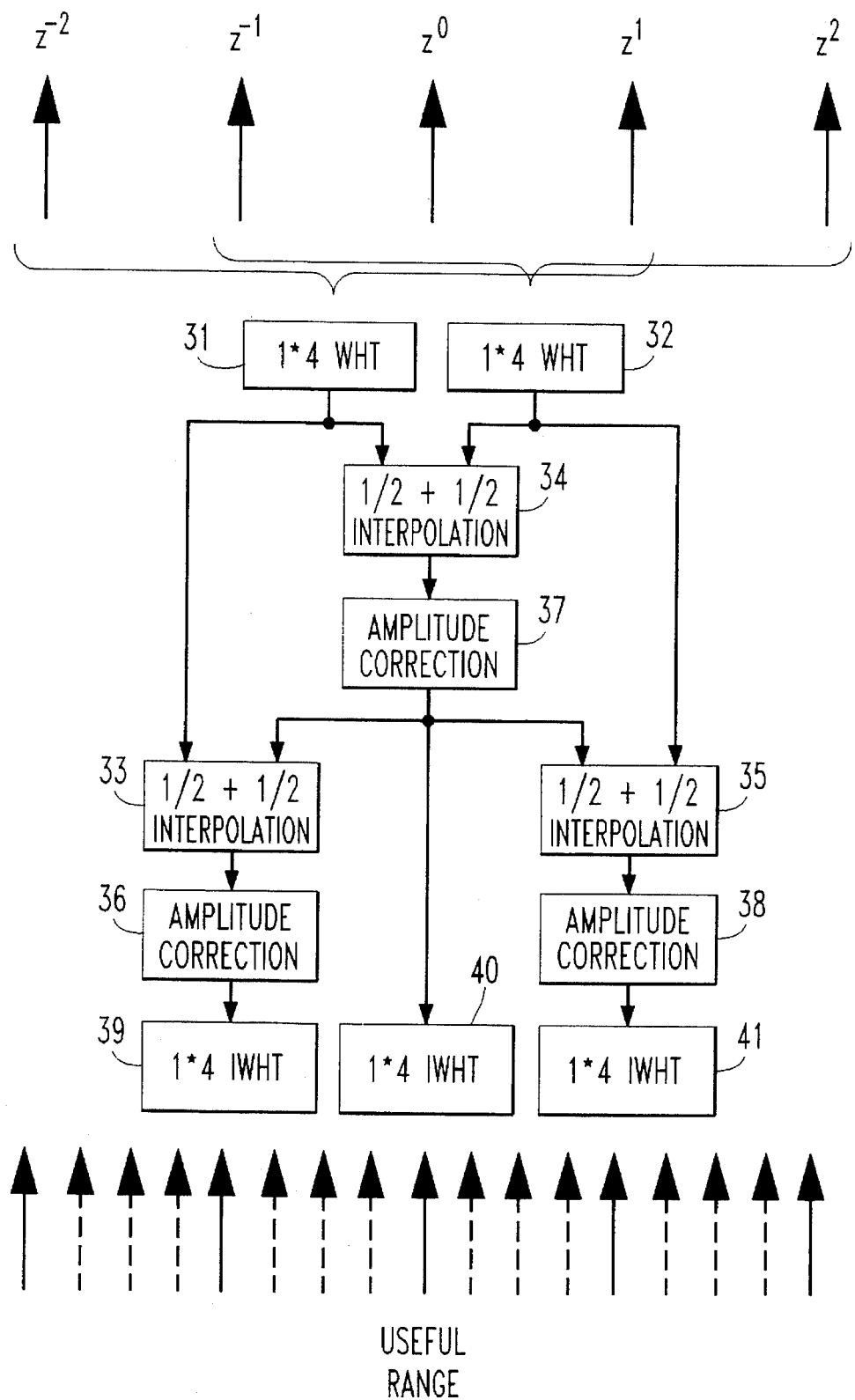
FIG. 5 A block circuit diagram for realizing an up-conversion by means of WHT.

As explained, the fundamental transformation of the Walsh-Hadamard transformation consists of a rectangular function with the values "+1" and "−1". For the processing stages this property of the WHT permits a multiplier-less and therefore very cost-effective realization. However, for sample rate conversion this WHT property tends to be disadvantageous in those cases where flexible conversion rates are sought. In order to achieve an adequately fine frequency transmission, in the case of interpolation in the WHT range a very high order is necessary for Walsh-Hadamard transformation. Transformation in the WHT range inherently gives a "virtual" sample rate, which is n times higher than the original rate, n being the width of the WHT window. Therefore, the Walsh-Hadamard transformation permits up-conversions of the sample rate in powers of 2 and supplies a virtual sample rate which is spaced line enough to subsequently permit down-conversion by simple interpolation to an arbitrary, non-integer fraction in the pixel domain. FIG. 5 shows an example of a block diagram for an up-conversion in the WHT domain according to the invention. The block diagram of FIG. 5 shows two (1×4)-WHT stages 31, 32, three interpolation stages 33, 34, 35, three amplitude correction stages 36, 37, 38 and three (1×4)-IWHT stages 39, 40, 41, which are interconnected in the indicated manner. In this basic diagram five successive input sample values are transformed into the WHT domain by means of two one-dimensional 1×4-WHT stages 31, 32, the input sample value $z^{-2}$ to $z^1$ being transformed in the first WHT stage 31 and the input sample values $z^{-1}$ to $z^2$ in the second WHT stage 32.

Corresponding WHT coefficients of the two resulting WHT matrixes are linearly interpolated in equally weighted manner, i.e. ½ $WHT_{o,x}$+½$WHT_{1,x}$, from which is obtained a time delay of half a clock interval and an amplitude response of cos(f/fclk·II). The amplitude response is subsequently corrected in the amplitude correction stage 37, in that the four individual WHT coefficients are multiplied with a fixed set of factors. The output signal of this amplitude correction stage is transformed back into the pixel domain by means of an inverse Walsh-Hadamard transformation in the 1×4 WHT stage 40, sample values being produced which in each case half-overlap.

This principle can be extended as shown in FIG. 5, in that the corrected WHT coefficients are linearly interpolated in equally weighted manner at the output of the amplitude correction stage 37 with the original WHT output coefficients of the WHT stages 31 and 32 and namely in the interpolation stages 33 and 35 undergo an amplitude correction in the correction stages 36 and 38 and in the IWHT stages 39 and 41 are transformed back into the pixel domain. Use is made of the fact that no further Walsh-Hadamard transformation is necessary, because the suitable corrected WHT coefficients are already available from the previous stage. In addition, the correction factors rapidly converge to "1" and the further correction stages could be superfluous.

When using the indicated scheme as a sample rate converter at any given point of time only one of the numerous values produced by the up-conversion arrangement according to FIG. 5 is of interest. It is also pointed out that of the five input sample values for this arrangement only four are required for a specific output sample value, if a slight ripple-through effect in the secondary amplitude correction stage is ignored. Which of the two quadruples from the five input sample values is chosen depends on whether the sought output sample value is to the left or right of the instantaneous central pixel z°, i.e. leading or trailing in time. Comprehensive theoretical considerations and calculations, as well as simulations of the sample rate converter according to the invention have shown that the ripple through effect in the second and all following stages can be ignored. The IWHT stages 39, 40, 41 can be omitted if the output sample values of the sample rate converter are to be further processed in the WHT domain.

In the search for an optimum value for a correction factor for the amplitude correction stages the aim was to find the minimum attainable, mean square error between the gain function of the filter dependent on the correction factor $\epsilon$ and an ideal unitary function over the frequency interval ranging from 0 to ¼ of the input sample rate.

An optimization was obtained at a correction value of $\epsilon$=0.1934 with which a signal-to-noise ratio SNR=49.92 dB was obtained. Research also revealed that the entire second and all following amplitude correction stages did not in any way significantly contribute to the signal-to-noise ratio (SNR) of the resulting signal. Therefore the arrangement of FIG. 5 could undergo further simplification in the manner schematically shown in FIGS. 6a to 6d.

Figure 6A:
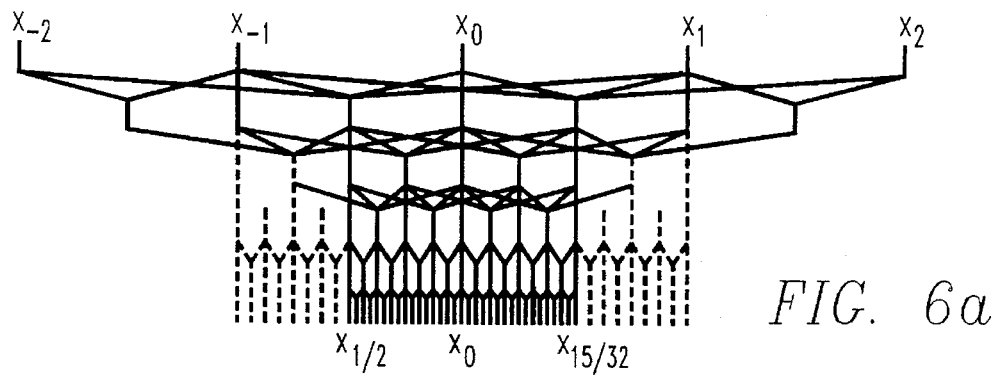
FIGS. 6a–6d include graphic reproduction of the sample rate conversion process according to 6d to the invention.
Figure 6B:
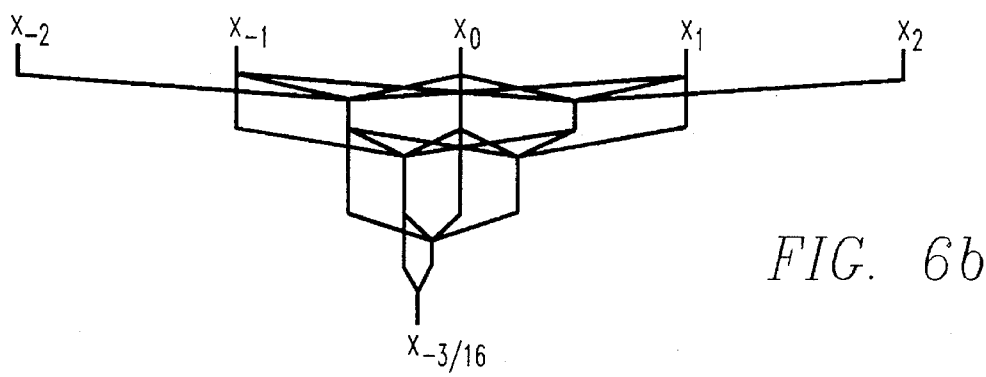
Figure 6C:
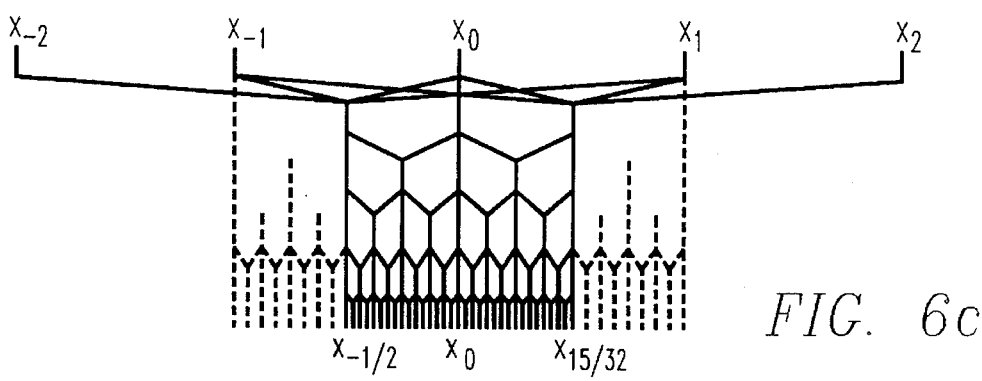
Figure 6D:
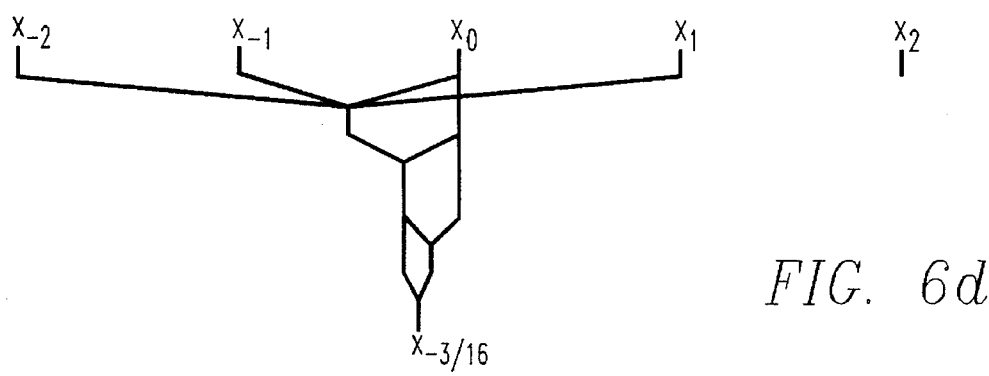

FIGS. 6a and 6b schematically show the interpolation principle of the arrangement of FIG. 5, the connection of the individual input sample values being shown by connecting lines. In FIG. 6a are shown all the possible output sample values of the IWHT stage 40 of FIG. 5, whereas FIG. 6b only shows a selected output sample value and the connections required. FIGS. 6c and 6d show a corresponding connection diagram for an arrangement simplified compared with FIG. 5, in which only four input sample values are required for forming the selected output sample value.

A further optimization of the signal-to-noise ratio SNR is also unnecessary under the standpoint that on the one hand the WHT coefficients can be varied at random and on the other a resolution of an 8 bit A/D converter corresponds to a theoretical limit of 48.16 dB. However, it is pointed out that for reaching the best possible integral signal-to-noise ratio over the entire frequency range, an improvement can be obtained by introducing a weighting factor. This weighting factor takes account of the fact that the perception of noise decreases with increasing spatial frequency of the noise. In addition, the direct spectral vicinity of the color subcarrier is particularly sensitive to noise, because a following demodulation makes any noise in this spectral range appear as low frequency noise in the color channels.

Figure 7:
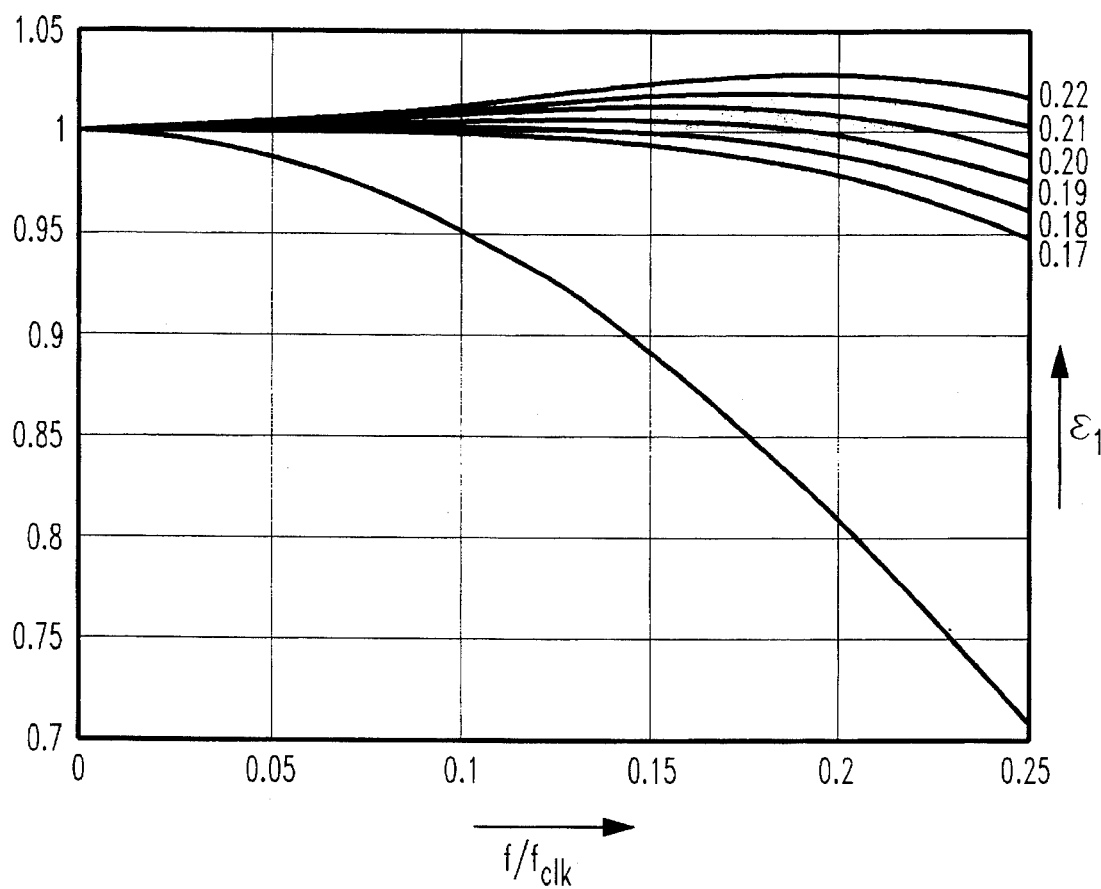
FIG. 7 The amplitude response of a first stage of the interpolator according to the invention.

FIG. 7 shows the gain function (amplitude response) of the resulting filter of the first stage of an interpolator according to the invention as a function of the relative frequency f/fclk and the correction factor $\epsilon$ for an interpolation between two original sample values. The gain function for a simple, bilinear interpolation is indicated as the reference quantity and is given as $\epsilon$=0.0.

Figure 8:
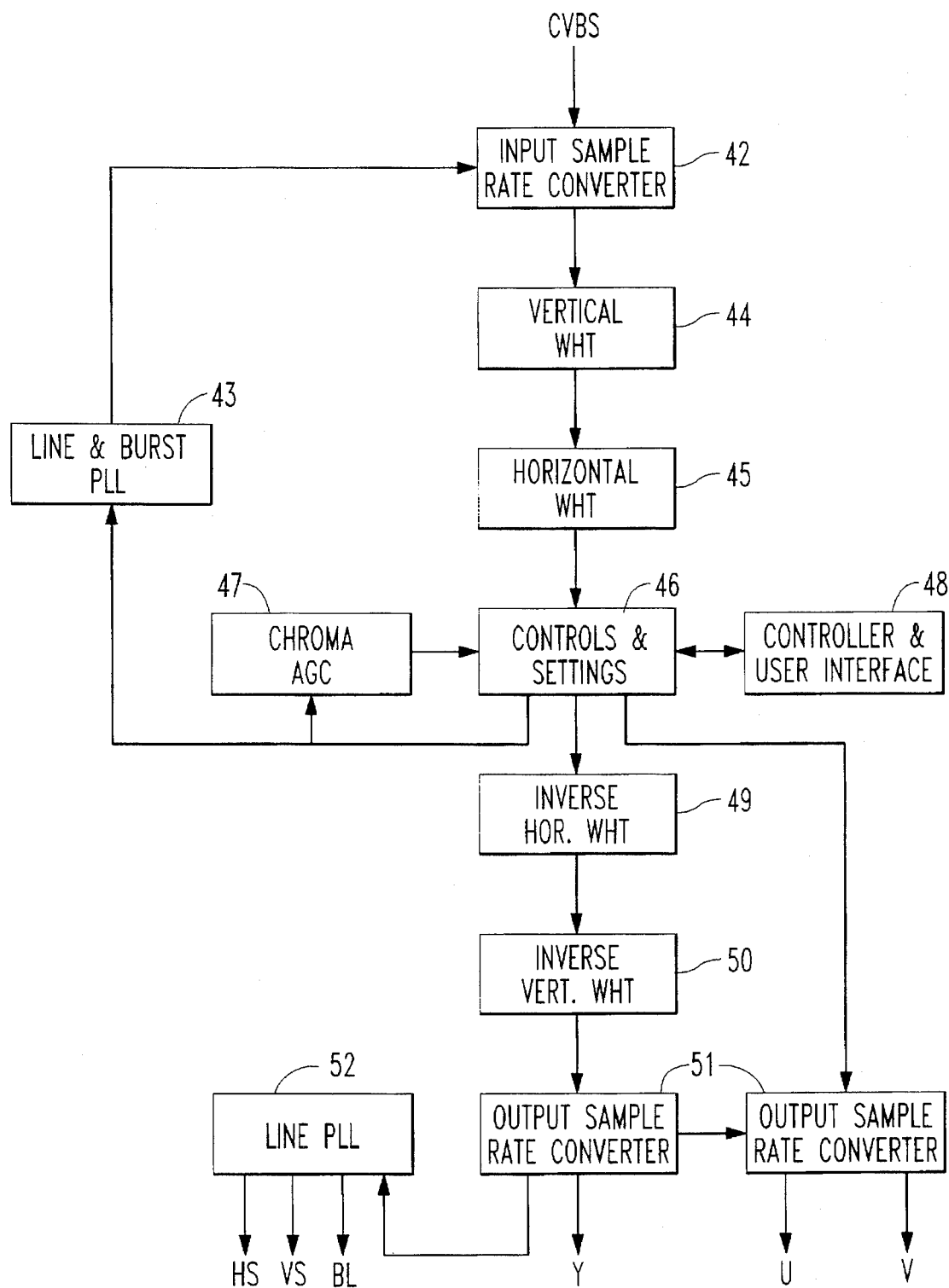
FIG. 8 A block circuit diagram of a preferred embodiment of a multistandard decoder using the sample rate converter according to the invention.

FIG. 8 shows the block circuit diagram of an embodiment of a digital multistandard decoder using an input sample rate converter according to the invention. The digital decoder comprises an input sample rate converter (SRC) 42, a line and burst phase locked loop (Line & Burst PLL) 43, a vertical WHT circuit 44 and a horizontal WHT circuit 45, a control and setting circuit 46, a chrominance automatic gain control circuit 47 (Chroma AGC), a controller and user interface 48, a horizontal IWHT circuit 49 and a vertical IWHT circuit 50, an output sample rate converter (SRC) 51 and a line phase-locked loop (Line PLL) 52.

The composite video signal (CVBS) digitized e.g. with the clock frequency of a host system, such as a computer, is inputted into the input sample rate converter 42. The line and burst phase locked loop 43 controls the input sample rate converter 42 in such a way that the input video signal digitized with the predetermined clock frequency is converted into a signal with sample values of a second virtual sample frequency, which is four times the color subcarrier frequency, as will be explained in greater detail hereinafter.

Through selecting the "virtual" sample frequency as four times the color subcarrier frequency on the one hand the Shannon Nyquist theorem ($f_a > 2 \cdot f_{sc}$) is fulfilled and on the other there is an integer number of sample values per video image line, namely 910 sample values per line for a NTSC signal and 1135 sample values per line for a PAL signal, so that it is possible to combine the advantages of a burst-locked architecture, in which the sample signal is an even integer multiple of the chrominance subcarrier frequency with the advantages of the line-locked architecture, in which the sample frequency is an integer multiple of the line frequency.

From the phase-locked loop 43 the sample rate converter receives a control signal, which gives the direction and magnitude of a shift or offset relative to a given, actual sample value, in order to determine the correct output sample value from the interpolated values as a desired sample value at the second, virtual sample frequency.

A particularly advantageous solution for a line and burst phase-locked loop is described in the corresponding application titled "Multinorm Decoder for Video Signals and Method for Video Signal Decoding" which is incorporated herein by reference.

The sample values of the composite video signal (CVBS) are then passed onto the vertical WHT circuit 44, whose output supplies the input signals for the following, horizontal WHT circuit 45.

The transformation of the digitized video signal by means of a Walsh-Hadamard transformation into the WHT range and the processing of the signal in the WHT range has proved particularly advantageous for obtaining a cost-optimized, digital multistandard decoder for video signals. Such a decoder and a corresponding digital video signal decoding process utilizing the advantages of Walsh-Hadamard transformation, are described in the parallel patent application of the same applicant and filed on Jun. 30, 1996 Ser. No. 08/496,868 entitled "Method for the Digital Decoding of Video Signals and Digital Decoder for Video Signals" which is incorporated herein by reference.

The vertical WHT circuit essentially forms a vertical low-pass filter and a vertical high-pass filter, which in each case adds and subtracts two corresponding sample values of two video image lines. In the horizontal WHT circuit the high-pass-filtered and low-pass-filtered sample values of one line are transformed alternately by means of a Walsh-Hadamard transformation into the WHT range. The resulting WHT matrix is then inputted into the control and setting circuit 36, in which on the one hand the chrominance signal components U and V are separated from the luminance signal component Y and on the other hand all the controls and settings of the signal can be performed centrally in the circuit.

The WHT matrix from which the chrominance signal components have been separated, is then transformed back into the pixel domain by means of the horizontal IWHT circuit 49 and the vertical IWHT circuit 50 and the decoded video signal components U, V and Y can, optionally following an output sample rate conversion by the output sample rate converter 51, be outputted by the digital decoder.

The function of the input sample rate converter is to convert into desired sample values at a virtual sample rate of four times the color subcarrier frequency of a NTSC or PAL video signal (CVBS) the input sample values derived from an 8 bit A/D converter timed with a crystal-controlled, but unknown clock rate between 20 and 40 MHz. Corresponding to the relative time position of a sought sample value with respect to an instantaneous, actual sample value, four of five input sample values are combined by means of a weighted addition, in order to form said sought output sample value of the input sample rate converter. The time position is determined by means of a phase-locked loop (PLL) in steps (increments) of $\frac{1}{32}$ of the host clock frequency. A look-up table (LUT) performs a multiplication of its input signal with a constant factor $\epsilon = 0.1934$. As the frequency response of the sample rate converter can slightly exceed a gain of one, an output signal limitation prevents an overflow.

FIG. 9 shows a preferred embodiment of an input sample rate converter according to the invention, which can be used with a digital decoder according to FIG. 8. The sample rate converter of FIG. 9 comprises four delay stages 53 to 56, a multiplexing device 57, a computing device with six adders 58 to 62 and 64, a reference table 63 and a multiplier 65, which are interconnected as shown in FIG. 9. At the input of the sample rate converter SRC$_{in}$ the input sample values are inputted into the delay stage 53 from where they pass through the further delay stages up to the final delay stage 56. The sample rate converter receives a control signal d, e.g. from the phase-locked loop 43 of the digital decoder shown in FIG. 8. The control signal d has a 5 bit resolution, the most significant bit indicating its polarity. This sign bit controls the input of the multiplexing device 57 and determines which four of the five delayed input sample values are added or subtracted by the adders 58, 59, 60 depending on the position of the sought desired sample value to the right or left of the central of the five input sample values. The four least significant bits give the absolute value of d corresponding to the delay or offset of the sought desired sample value relative to the central of the five input sample values and are used as the input signal for the multiplier 65.

The amplitude correction factor s is introduced by means of the look-up table (LUT) 63, which economizes on one multiplier for realizing the sample rate converter according to FIG. 9.

However, the look-up table (LUT) 63 can be replaced by a multiplier into which is inputted the correction factor $\epsilon$. The computing device 58 to 65 performs the following equations obtained from a combination of the 1×4-WHT with the equally rated, linear interpolation and the amplitude correction according to a basic function of the block circuit diagram of FIG. 5:

$$H1(z)_d = |d| \cdot [(z^{-1} - z^0) - \epsilon \cdot (z^{-2} - z^{-1} - z^0 + z^1)] + z^0 \text{ for } d < 0$$

$$H2(z)_d = |d| \cdot [(z_1 - z^0) - \epsilon \cdot (z^{-1} - z^0 - z^1 + z^2)] + z^0 \text{ for } d \geq 0$$

in which $z^{-2}$ to $z^{+2}$ are in each case the input sample values delayed in a delay stage 53, 54, 55 or 56 and H1(z) and H2(z) are the output signals SRC$_{out}$ of the sample rate converter.

For the control signal d the following applies:

$d = (i - 16)/32$     for $d < 0$ and
$d = i/32$     for $d \geq 0$ in which i=1 ... ,15.

Interpolation values between the input pixels or desired sample values of the virtual sample frequency can consequently be outputted with a resolution of 1/32 of the predetermined clock frequency. The correction factor ∈ is preferably in the range $0.18 \geq \epsilon \geq 0.222$.

With the sample rate converter circuit shown in FIG. 9 it is possible to particularly simply and effectively realize the simplified diagram shown in FIG. 6d for performing an upconversion by means of WHT shown in the block circuit diagram of FIG. 5. As in the proposed use of the sample rate converter according to FIG. 8 the further processing of the video signal takes place in the WHT domain, there is no need for a back-transformation into the pixel domain.

Unlike in the input sample rate converter, in the case of the proposed use for the digital decoder according to FIG. 8 an output sample rate converter only has to process base band signals Y, U and V and not composite video signals (CVBS), which with the color carrier frequency contain information with a high spectral component occurring as d.c. voltage after demodulation. The linearity requirements of the frequency-dependent gain function of the sample rate converter are consequently much lower.

In place of the described sample rate converter according to the invention it is consequently possible to use for the output sample rate conversion a simple, linear interpolation between two adjacent pixels. Such an output sample rate converter is shown in FIG. 10 and comprises a delay element 66, two adders 67, 68 and a multiplier 69. This sample rate converter realizes the following equation:

$$z = a \cdot x_1 + (1-a) \cdot x_2 \text{ or}$$

$$z = a \cdot (x_1 - x_2) + x_2$$

The features of the invention disclosed in the description, drawings and claims, both individually and in random combination, can be of significance for implementing the different embodiments of the invention.

While the method(s) herein described, and the form(s) of apparatus for carrying this (these) method(s) into effect, constitute preferred embodiments of this invention, it is to be understood that the invention is not limited to this (these) precise method(s) and form(s) of apparatus, and that changes may be made in either without departing from the scope of the invention, which is defined in the appended claims.

What is claimed is:

1. A method for sample rate conversion, in which input sample values of a signal digitized at a first predetermined clock frequency are converted into desired sample values at a second virtual sample frequency, comprising the steps of:

performing an equally weighted interpolation between each of two adjacent sample values, correcting the amplitude of the interpolation result obtained in the interpolation, performing an equally weighted interpolation of the corrected interpolation result is in each case with its neighboring values, wherein the neighboring values being neighboring sample values or neighboring interpolation results, correcting the amplitude of the interpolation result obtained in the weighted interpolation of the corrected interpolation; and repeating the interpolation and correction until a desired resolution necessary for the virtual sample frequency is obtained.

2. The method according to claim 1, wherein the interpolation results obtained in the repeating step further comprising the step of obtaining those results which correspond to desired sample values at the virtual sample frequency.

3. The method according to claim 1, further comprising the step of forming only the interpolation results necessary for the desired sample values at the virtual sample frequency.

4. The method according to claim 1, further comprising the steps of:

transforming five successive input sample values ($z^{-2}$ to $z^{+2}$) in two blocks of four adjacent values ($z^{-2}$ to $z^1$ and $z^{-1}$ to $z^2$) into the WHT domain by means of two one-dimensional (1*4) Walsh-Hadamard transformations (WHT), interpolating corresponding WHT coefficients of the two WHT matrixes formed thereon in equally weighted manner; and multiplying the resulting WHT coefficients with a correction factor.

5. The method according to claim 4, further comprising the step of:

transforming the corrected WHT coefficients back into the pixel domain by means of an inverse (1*4) WHT.

6. The method according to claim 4, wherein the corrected WHT coefficients are used directly for the further processing of the sample values in the WHT domain.

7. A sample rate converter, which converts input sample values of a signal digitized at a first predetermined clock frequency into desired sample values at a second virtual sample frequency, comprising:

a delay means, which delays the serial input sample values and outputs in parallel a block of delayed input sample values $z^{-2}$ to $z^{+2}$, a computing means with a WHT stage, which transforms the delayed input sample values ($z^{-2}$ to $z^{+2}$) into the WHT domain by means of a Walsh-Hadamard transformation, utilizing the following equations:

$H1(z)_d = |d| \cdot [(z^{-1} - z^0) - \epsilon \cdot (z^{-2} - z^{-1} - z^0 + z^1)] + z^0$ for $d<0$ $H2(z)_d = |d| \cdot [(z^1 - z^0) - \epsilon \cdot (z^{-1} - z^0 - z^1 + z^2)] + z^0$ for $d \geq 0$ in which d is the delay of the sought desired sample value relative to the central of the five input sample values $z^0$ and ∈ is a correction factor, and an interpolating means, which interpolates in equally weighted manner the resulting WHT coefficients and performs an amplitude correction of the interpolation.

8. The sample rate converter according to claim 7, further comprising;

a multiplexer connected between the delay means and the computing means, which selects four adjacent values from five input sample values $z^{-2}$ to $z^{+2}$, namely $z^{-2}$ to $z^{+1}$ or $z^{-1}$ to $z^{+2}$ and transfers them to the computing means, as a function of the position of the sought desired sample value relative to the central of the five input sample values $z^0$.

9. The sample rate converter according to claim 7, wherein;

$$d = (i - 16)/32 \quad \text{for } d < 0 \text{ and}$$
$$d = i/32 \quad \text{for } d \geq 0$$

in which i=1 . . . ,15, and $0.18 \leq \epsilon \leq 0.22$, in particular $\epsilon=0.1934$.

10. The sample rate converter according to claim 7, wherein the computing means has six adders and two multipliers.

11. The sample rate converter according to claim 7, wherein the computing means further comprises:
    six adders,
    a multiplier for weighting the interpolation result with d and a look-up table (LUT) for introducing the correction factor $\epsilon$.

12. The sample rate converter according to claim 7, wherein said sample rate converter being utilized as an input stage and/or output stage for a digital multistandard decoder for video signals.

13. A sample rate converter, which converts input sample values of a signal digitized at a first predetermined clock frequency into desired sample values at a second virtual sample frequency, comprising:
    a delay circuit, which delays the serial input sample values and outputs in parallel a block of delayed input sample values $z^{-2}$ to $z^{+2}$,
    a computing circuit with a WHT stage, which transforms the delayed input sample values ($z^{-2}$ to $z^{+2}$) into the WHT domain by a Walsh-Hadamard transformation, utilizing the following equations:

$$H1(z)_d = |d| \cdot [(z^{-1}-z^0) - \epsilon \cdot (z^{-2}-z^{-1}-z^0+z^1)] + z^0 \text{ for } d < 0$$

$$H2(z)_d = |d| \cdot [(z^1-z^0) - \epsilon \cdot (z^{-1}-z^0-z^1+z^2)] + z^0 \text{ for } d \geq 0$$

in which d is the delay of the sought desired sample value relative to the central of the five input sample values $z^0$ and $\epsilon$ is a correction factor, and
    an interpolating circuit, which interpolates in equally weighted manner the resulting WHT coefficients and performs an amplitude correction of the interpolation results.

14. The sample rate converter according to claim 13, further comprising;
    a multiplexer connected between the delay circuit and the computing circuit which selects four adjacent values from five input sample values $z^{-2}$ to $z^{+2}$, namely $z^{-2}$ to $z^{+1}$ or $z^{-1}$ to $z^{+1}$ and transfers them to the computing circuit, as a function of the position of the sought desired sample value relative to the central of the five input sample values $z^0$.

15. The sample rate converter according to claim 13, wherein;

$$d = (i - 16)/32 \quad \text{for } d < 0 \text{ and}$$
$$d = i/32 \quad \text{for } d \geq 0$$

in which i=1 . . . ,15, and $0.18 \geq \epsilon \geq 0.22$, in particular $\epsilon=0.1934$.

16. The sample rate converter according to claim 13, wherein the computing circuit has six adders and two multipliers.

17. The sample rate converter according to claim 13, wherein the computing circuit further comprises:
    six adders,
    a multiplier for weighting the interpolation result with d and a look-up table (LUT) for introducing the correction factor $\epsilon$.

18. The sample rate converter according to claim 13, wherein said sample rate converter being utilized as an input stage and/or output stage for a digital multistandard decoder for video signals.

19. A sample rate converter, which converts input sample values of a signal digitized at a first predetermined clock frequency into desired sample values at a second virtual sample frequency, comprising:
    a delay means, which delays the serial input sample values and outputs in parallel a block of delayed input sample values $z^{-2}$ to $z^{+2}$, and
    a computing means, which transforms the delayed input sample values ($z^{-2}$ to $z^{+2}$), into output signals, utilizing the following equations, $$H1(z)_d = |d| \cdot [(z^{-1}-z^0) - \epsilon \cdot (z^{-2}-z^{-1}-z^0+z^1)] + z^0 \text{ for } d < 0$$

$$H2(z)_d = |d| \cdot [(z^1-z^0) - \epsilon \cdot (z^{-1}-z^0-z^1+z^2)] + z^0 \text{ for } d \geq 0$$

in which d is the delay of the sought desired sample value relative to the central of the five input sample values $z^0$ and $\epsilon$ is a correction factor.

20. The sample rate converter according to claim 19, further comprising;
    a multiplexer connected between the delay means and the computing means which selects four adjacent values from five input sample values $z^{-2}$ to $z^{+2}$, namely $z^{-2}$ to $z^{+1}$ or $z^{-1}$ to $z^{+1}$ and transfers them to the computing means, as a function the position of the sought desired sample value relative to the central of the five input sample values $z^0$.

21. The sample rate converter according to claim 19, wherein;

$$d = (i - 16)/32 \quad \text{for } d < 0 \text{ and}$$
$$d = i/32 \quad \text{for } d \geq 0$$

in which i=1 . . . ,15, and $0.18 \geq \epsilon \geq 0.22$, in particular $\epsilon=0.1934$.

22. The sample rate converter according to claim 19, wherein the computing means has six adders and two multipliers.

23. The sample rate converter according to claim 19, wherein the
    computing means has six adders, one multiplier and a correction factor look up table.

24. A sample rate converter, which converts input sample values of a signal digitized at a first predetermined clock frequency into desired sample values at a second virtual sample frequency, comprising:
    a delay circuit, which delays the serial input sample values and outputs in parallel a block of delayed input sample values $z^{-2}$ to $z^{+2}$,
    a computing circuit, which transforms the delayed input sample values ($z^{-2}$ to $z^{+2}$) into an output signal, utilizing the following equations:

$$H1(z)_d = |d| \cdot [(z^{-1}-z^0) - \epsilon \cdot (z^{-2}-z^{-1}-z^0+z^1)] + z^0 \text{ for } d < 0$$

$$H2(z)_d = |d| \cdot [(z^1-z^0) - \epsilon \cdot (z^{-1}-z^0-z^1+z^2)] + z^0 \text{ for } d \geq 0$$

in which d is the delay of the sought desired sample value relative to the central of the five input sample values $z^0$ and $\epsilon$ is a correction factor.

25. The sample rate converter according to claim 24, further comprising;
    a multiplexer connected between the delay circuit and the computing circuit selects four adjacent values from five input sample values $z^{-2}$ to $z^{+2}$, namely $z^{-2}$ to $z^{+1}$ or $z^{-1}$ to $z^{+1}$ and transfers them to the computing circuit a function of the position of the sought desired sample value relative to the central of the five input sample values $z^°$.

26. The sample rate converter according to claim 24, wherein;

$d = (i - 16)/32$     for $d < 0$ and
$d = i/32$     for $d \geqq 0$ in which i=1 . . . ,15, and $0.18 \geqq \epsilon \geqq 0.22$, in particular $\epsilon = 0.1934$.

27. The sample rate converter according to claim 24, wherein the computing circuit has six adders and two multipliers.

28. The sample rate converter according to claim 24, wherein the computing means has six adders, one multiplier and a correction factor look up table.

\* \* \* \* \*

UNITED STATES PATENT AND TRADEMARK OFFICE
CERTIFICATE OF CORRECTION

PATENT NO. : 5,619,270
DATED : April 8, 1997
INVENTOR(S) : Walter Demmer

It is certified that error appears in the above-identified patent and that said Letters Patent is hereby corrected as shown below:

Title page, item [73], Assignee: should be -- Harris Corporation, Melbourne, FL--.

Signed and Sealed this

Tenth Day of February, 1998

Attest:

BRUCE LEHMAN

Attesting Officer

Commissioner of Patents and Trademarks